Nov. 1, 1932.    H. P. SMITH    1,886,131
STORAGE TANK
Filed Sept. 13, 1930    5 Sheets-Sheet 1

Nov. 1, 1932.   H. P. SMITH   1,886,131
STORAGE TANK
Filed Sept. 13, 1930   5 Sheets-Sheet 2

INVENTOR
Hubert P. Smith
By Green & McCallister
His Attorneys

Nov. 1, 1932. H. P. SMITH 1,886,131
STORAGE TANK
Filed Sept. 13, 1930 5 Sheets-Sheet 4

INVENTOR
Hubert P. Smith
By Green & McCallister
His Attorneys

Nov. 1, 1932.  H. P. SMITH  1,886,131
STORAGE TANK
Filed Sept. 13, 1930  5 Sheets-Sheet 5

INVENTOR
Hubert P. Smith
By Green & McCallister
His Attorneys

Patented Nov. 1, 1932

1,886,131

UNITED STATES PATENT OFFICE

HUBERT P. SMITH, OF EMSWORTH, PENNSYLVANIA

STORAGE TANK

Application filed September 13, 1930. Serial No. 481,698.

This invention relates to storage tanks for storing liquids, such as oils, gasolines and the like, in which the liquid in the tank is substantially covered by a floating roof or deck and more particularly to means for maintaining the deck in level position in the tank at all times. Floating decks heretofore used in storage tanks have been much smaller in diameter than the shell of the tank. Such a construction was necessary in order to prevent the deck from binding against the shell when it became tilted due to the shell becoming out of round or to an uneven distribution of water, snow or the like on the deck itself. As a result of the difference between the diameters of the shell and the tank a large evaporation area was created and a considerable amount of the volatile matter in the oils and gasolines being stored were permitted to escape.

An object of this invention is to provide means for maintaining a floating deck level in the shell of a storage tank at all times regardless of the elevation of the liquid therein or the eccentricity of the roof load.

Another object of this invention is to provide means for preventing a floating deck from tilting or turning over within the shell.

A further object is to provide means for preventing a floating deck from tilting in the shell of the tank so that less clearance will be necessary between the shell and the deck and consequently the area of evaporation will be reduced to a minimum.

Another object of the invention is to provide a storage tank having a shell provided with helical guideways for rotating and leveling the floating deck.

Another object is to provide a floating deck in which the clearance between the tank and the deck may be adjustable.

These and other objects of this invention which are readily apparent to those skilled in this particular art are obtained by means of the hereinafter described invention disclosed in the accompanying drawings wherein:

In general this invention comprises a storage tank having a shell and a roof or deck adapted to float on the oil or liquid in the shell. The deck is provided with mating devices spaced around the periphery thereof which engage and cooperate with inwardly projecting guides on the shell and maintain the deck level therein at all times. The guides on the shell extend helically from the top to the bottom thereof and impart rotational movement to the deck as the level of the oil within the tank changes. These mating devices also maintain the deck in level position within the shell at all times.

Referring to the drawings in detail, 1 designates the cylindrical shell of a liquid storage tank and 4 a roof or deck therefor which floats on the liquid in the tank. The shell is mounted on a suitable foundation and has a series of guides 2, projecting inwardly from the inner surface thereof, which are received in recesses or slots 3 formed in the periphery or rim 5 of the deck 4. The guides extend from the top to the bottom of the shell and are arranged in the form of a helix and the recesses or guide-receiving slots 3 are so formed on the rim 5 as to correspond to the angle at which the guides 2 are placed on the shell. It is readily apparent from the above that the guides will impart rotational movement to the deck as it is raised or lowered in the tank, due to the changing of the level of the liquid in the tank.

Figure 1:
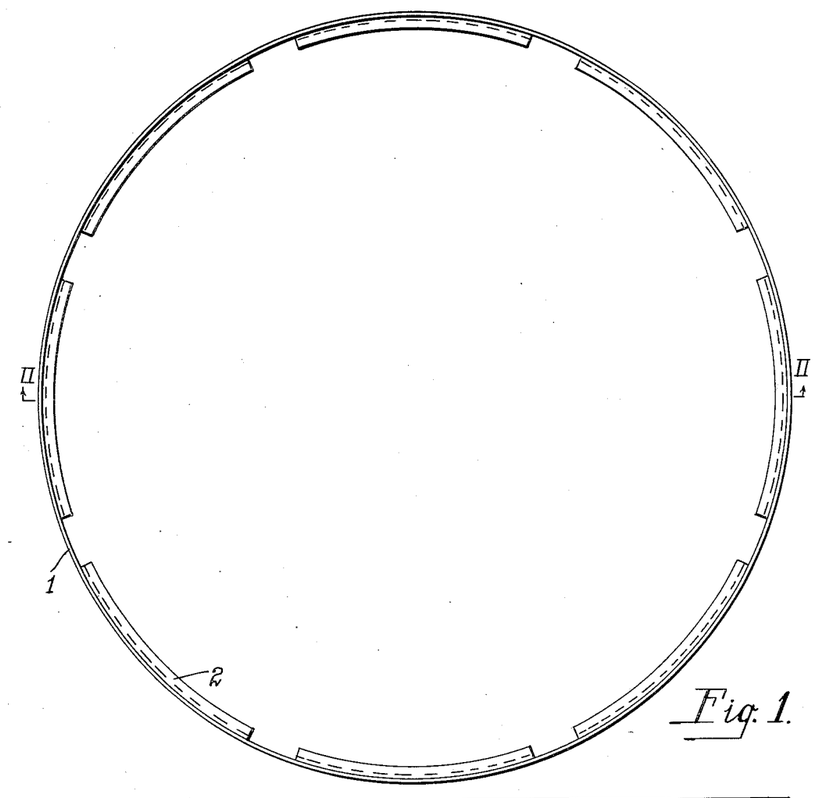
Figure 1 is a top plan view of a storage tank shell.
Figure 2:
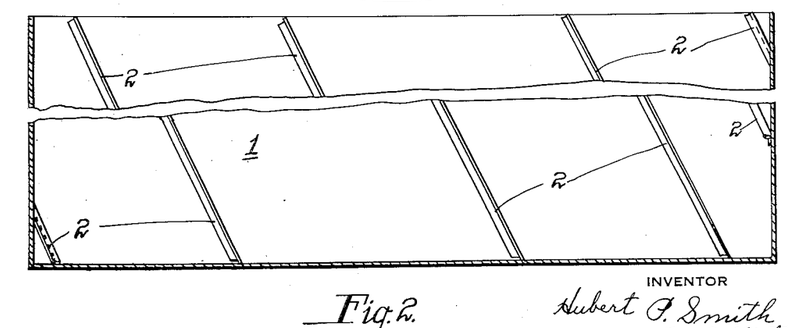
Fig. 2 is a view in vertical section taken on line II—II of Fig. 1.
Figure 3:
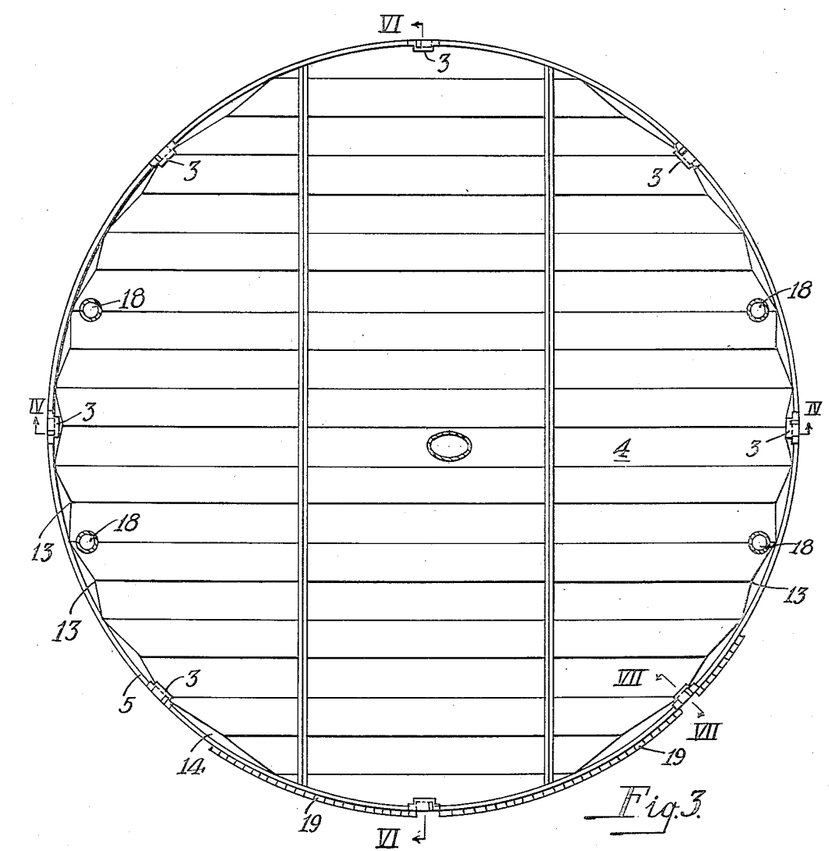
Fig. 3 is a top plan view of a floating deck embodying this invention.
Figures 4, 5:
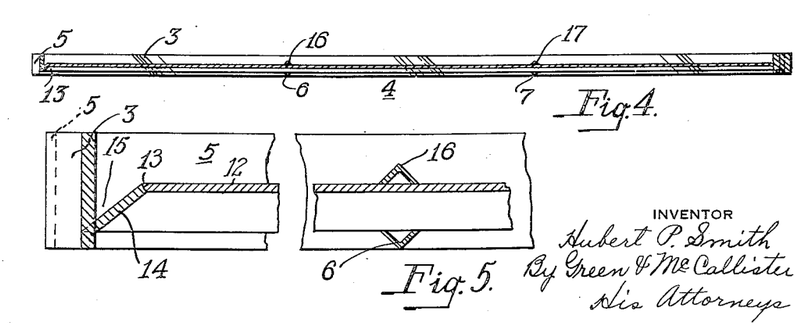
Fig. 4 is a view in vertical section taken on line IV—IV of Fig. 3.
Fig. 5 is a partial enlarged view of Fig. 4.

The guides 2 may be formed from any suitable material and of any desired shape. In Fig. 2 while I have shown the guides in the form of angle irons, the flanges of which extend inwardly from the shell, it is to be understood that the guides may have any other desired shape without departing from the spirit of this invention.

While my invention is applicable to any type of floating deck, I preferably use a deck which is formed of sheet metal plates secured together in such a way as to provide a series of "peaks" and "valleys". In making my preferred form of floating deck, a cylindrical band 5, forming the rim of the deck, is constructed within the shell 1, which is slightly smaller in diameter than the diameter of the shell so that sufficient clearance is provided therebetween.

A plurality of plate supporting members 6 and 7, two of which are shown, are then secured to the bottom of the rim on opposite sides of the center thereof. The plate supporting members are shown as angle irons which are inverted so as to form larger bearing surfaces for the roof. The roof proper of the deck is formed from plates which extend across the supporting members at right angles thereto and are arranged so that each plate forms a chord with a portion of the rim 5. In constructing the roof, the first plate designated by the numeral 8 has an arcuate edge and is placed across the supporting members 6 and 7 in such a way that the arcuate edge thereof bears against the band, at a point somewhat higher than the edge of the plate resting on the supporting members, (Fig. 6), so that it slopes from the rim toward the supporting members. The edges of the plate 8 are then welded to the rim 5 and the supporting members 6 and 7. A plate 9 is then placed across the supporting members having one edge thereof abutting against the edge of plate 8 while the other edge is elevated somewhat from the supporting members so that it slopes toward the first plate 8 and forms a V-shaped section or valley 10 therebetween. A third plate 11 is then placed across the supporting members with one edge abutting the high edge of the second plate 9 and the other edge resting upon the supporting members so that it slopes in an opposite direction to that of plate 9 forming a peak 12 therebetween.

The plates forming the remainder of the roof are arranged in a like manner and forms a roof having a series of peak and valley sections alternately arranged. The edges of the abutting plates are welded together making a solid roof. In order to form a continuous gutter around the edge of the roof the ends of the plates forming the peaks of the roof are beveled as at 13 and covered with arcuate shaped plates 14 which are welded to the beveled end portions of the plates and to the rim and forms a gutter 15 around the edge of the rim. The valleys 10 form gutters leading across the roof to the edge gutter and tend to distribute the water collected on the roof and equalize the pressure thereof over the whole of the roof. Drain holes 18 may be provided at regular intervals in valley sections of the roof adjacent the rim for drawing off any water which may collect on the roof. Collapsible pipes, flexible hose or any other suitable type of connection (none shown) may be provided for conducting the water drawn off through the drain holes to the outside of the tank.

Figure 6:
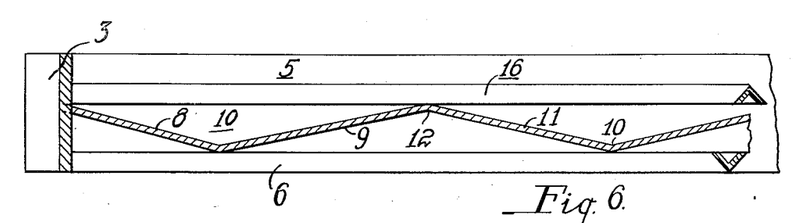
Fig. 6 is a partial view in section taken on line VI—VI of Fig. 3.

As shown in Fig. 6 the rim 5 of the roof extends above the peaks 12 and forms a basin on the top of the deck. If it is desired to have a water cover for the tank, the drain pipes 18 may be extended a fixed distance above the top of the roof gutters or valleys 10 so that the desired amount of water will be retained on the roof. By having a water top or cover on the roof the liquid in the tank is protected from the direct rays of the sun and less evaporation of the liquid in the tank occurs.

Members 16 and 17 extend across the top of the roof transversely of the plates and strengthen the roof or deck 4. These stiffening members replace the reinforcing trusses and hog rods customarily used in roof construction.

To reduce the area of evaporation of the oil around the deck, filler blocks 19 may be fastened to the rim of the deck. The filler blocks are removable and may be replaced by other strips of greater or less thickness whenever it is necessary to make adjustment in the clearance between the deck and the shell as when the shell becomes out of round, etc. The filler blocks 19 may be made of wood or any other suitable material.

Frequently rain or snow will accummulate unevenly on the deck and cause it to cant or tilt. To prevent the deck from tilting, mating devices are disposed in the recesses or slots 3 around the periphery of the deck which engage and cooperate with the guides 2 for maintaining the deck level within the tank. The mating devices are provided with surfaces which bear against the guides on opposite sides thereof so that when such accumulations occur, the surface of the mating device adjacent the accumulation will bear against the top surface of the guide and will tend to rotate the deck in one direction. At the same time the lower surface of the mating device on the deck diametrically opposite the first mentioned device will engage the lower surface of the guide with which it is in engagement and will tend to rotate the deck in the opposite direction. Thus two counteracting forces are set up which equalize each other and maintain the deck level within the shell.

Figure 7:
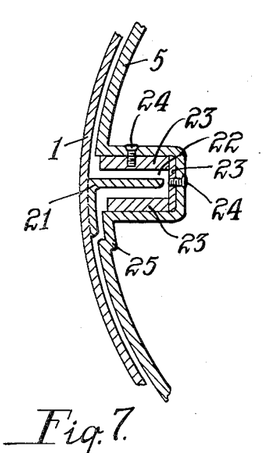
Fig. 7 is a view in section of a leveling device taken on line VII—VII of Fig. 3.

In Fig. 7, I have illustrated one form of mating device for leveling the deck in the shell when the guides 2 are in the form of angles 21 welded or riveted to the inner wall of the shell. The angles 21 are received in recesses 22 formed in the rim 5 of the deck at an angle corresponding to the angle at which the guides are fastened to the shell. The sides and back of each of the recesses 22 are lined with rubbing strips 23 which are held in place by cap screws 24 so that they may be readily replaced when the same become worn. Also by having the rubbing strips replaceable, a certain amount of adjustment is permitted in the leveling device for securing the proper clearance between the guides on the shell and the mating device on the roof since the strips of any desired thickness may be employed.

In order to reduce the clearance between the deck and the shell to the minimum the rim 5 of the deck is offset as at 25 to receive the base of the angle 21.

Figures 8, 9:
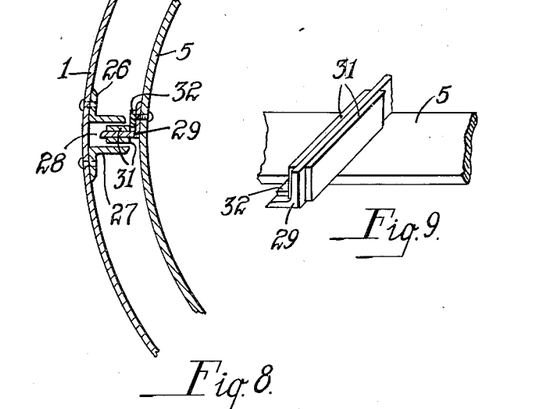
Fig. 8 is a view in section of a modified form of leveling device.
Fig. 9 is a partial view in perspective of a portion of the leveling device attached to the floating deck.

In Figs. 8 and 9 I have disclosed a modified form of leveling device in which the helical guides are formed of oppositely disposed angle irons 26 and 27 which are spaced apart so as to form a groove 28 therebetween in which an angle iron 29 secured to the periphery of the deck is received. The leg of the angle 29 which extends into the groove 28 is provided with rubbing strips 31 on each side thereof. The rubbing strips 31 are removably fastened to the member 29 so as to permit adjustment for clearance as in the previous modification. A rubbing strip 32 is also provided on the base of the angle 29 against which the end of the angle 26 rubs when there is a horizontal thrust set up by an eccentric load on the deck.

Figure 10:
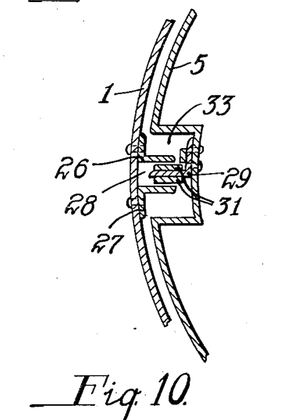
Fig. 10 is a view in section in which the leveling device is received in a recess in the floating deck.

When the angles 29 are placed around the periphery of the deck, the clearance between the shell and the deck is substantially greater than is necessary therefore to reduce this clearance, the periphery of the deck may be recessed as at 33 (Fig. 10) to receive the angle iron 29.

Figure 11:
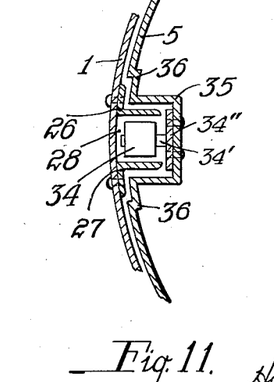
Fig. 11 is another modification of a leveling device in which the rubbing strip has been replaced by a roller.
Figure 12:
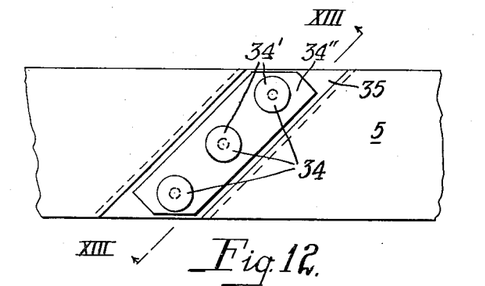
Fig. 12 is a partial view in perspective of the edge of the floating deck embodying the modification shown in Fig. 11.
Figure 13:
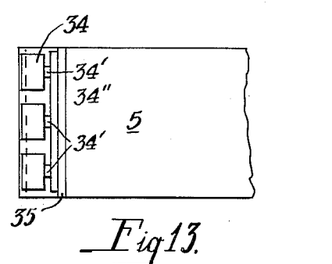
Fig. 13 is a view in section taken on line XIII—XIII of Fig. 12.

In Figs. 11, 12 and 13, I have illustrated another modified form of leveling device in which the angles secured in the recesses formed in the periphery of the deck are replaced by a series of non-friction rollers 34. Each series of rollers 34 are journalled on the ends of shafts 34' which are mounted on a plate 34" secured in a recess 35 formed in the periphery of the deck. The rollers 34 have relatively wide faces so that considerable horizontal movement of the deck is permitted without disengaging the rollers from the groove 28. The edges of the rim adjacent the recess may be offset as at 36 to provide clearance between the deck and the base of the angles 26 and 27.

Figures 14, 15, 16, 24:
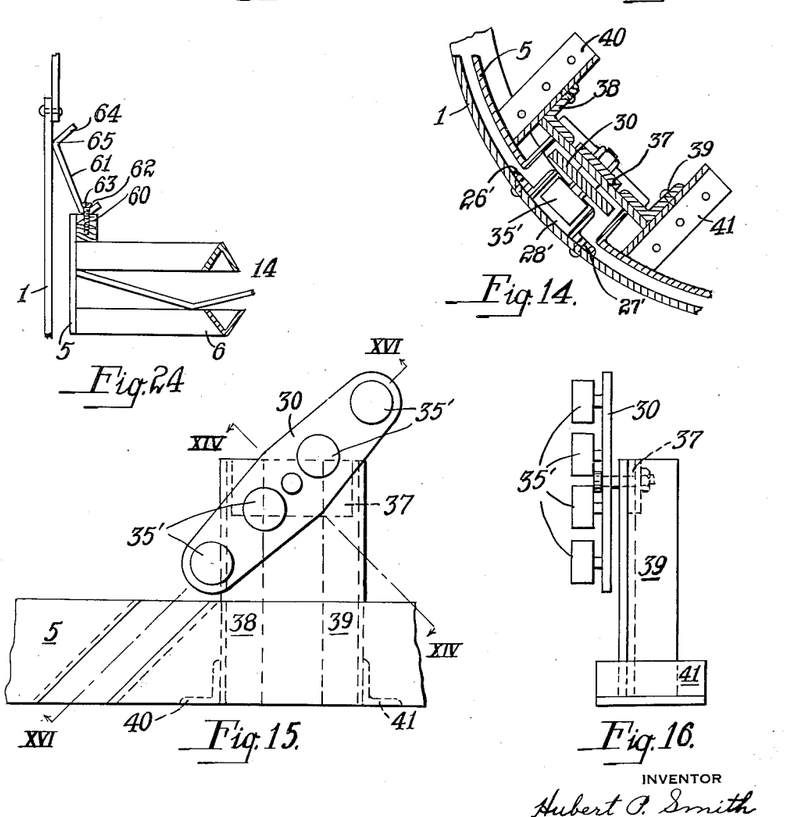
Fig. 14 is a view in section of another modified form of leveling device.
Fig. 15 is a view in elevation of a floating deck having the leveling device of Fig. 14 connected thereto.
Fig. 16 is a view in section taken on line XVI—XVI of Fig. 15.
Fig. 24 is a partial view in section of a shield for a floating deck.
Figure 17:
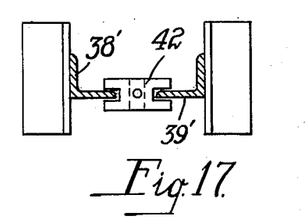
Fig. 17 is a view in section of a modified form of mounting for the leveling device shown in Fig. 15.
Figure 18:
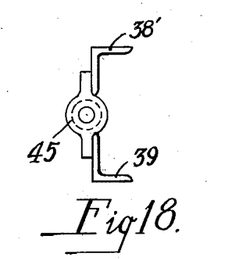
Fig. 18 is a top plan view of the mounting.

In Figs. 14, 15 and 16 I have illustrated another modified form of leveling device in which rollers 35' are adapted to be received within a groove 28' formed between angles 26' and 27' which are secured to the inner surface of the shell. The rollers 35' are mounted on an arm 30 pivoted to a plate 37 which is supported by uprights 38 and 39. The uprights are mounted on the deck and are secured in place thereon by angles 40 and 41. In this modification the arm supporting the rollers is free to turn on its pivot which permits a limited movement of the arm, thereby insuring an even distribution of load to each roller.

In Figs. 17, 18, 19 and 20 I have illustrated another form of mounting the arm 30 which supports the rollers 34 to the deck. In this modification the arm 30 is pivoted to an H-shaped block 42 which is slidably mounted on the uprights 38' and 39' so that vertical movement thereof is permitted.

The vertical movement of the block 42 is limited by a spring member 43, the tension of which is adjustable by a screw 44 extending through a collar 45 fastened across the top of the uprights 38' and 39'. The downward movement of the block is limited by the shoulders 46 formed on the uprights.

Figures 19, 20, 21, 22, 23:
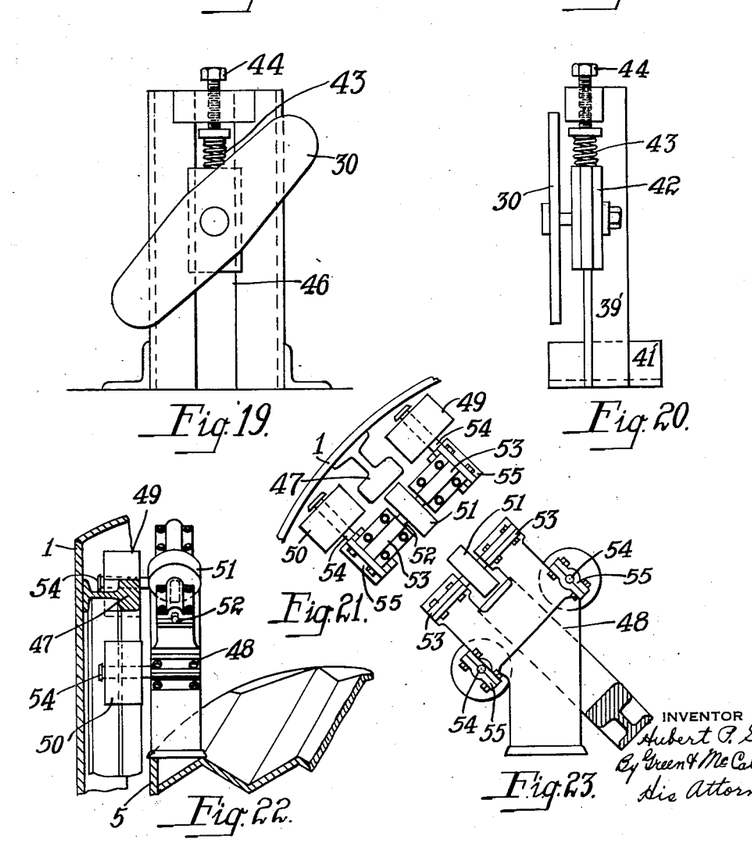
Fig. 19 is a view in front elevation of the mounting.
Fig. 20 is a view in side elevation of the mounting in Fig. 17.
Fig. 21 is a top plan view of a modified form of leveling device.
Fig. 22 is a view in side elevation of the device shown in Fig. 21.
Fig. 23 is a view in rear elevation.

In Figs. 21, 22 and 23 I have illustrated another modification of my leveling device. In this modification, the shell of the tank is provided with T-shaped rails 47 which extend helically from the top to the bottom thereof and form the guides for rotating the deck. Mounted on the deck in any suitable manner are upright members 48 which support non-friction rollers 49, 50 and 51. The rollers 49, 50, and 51 are mounted on the uprights so as to engage the sides and top of the rails 47 respectively.

The roller 51 is mounted on a shaft 52 carried in box bearings 53 in the member 48, and the rollers 49 and 50, which engage the sides of the rail in front of the roller 51, are carried on shafts 54 journalled in box bearings 55, making the rollers readily removable so that the leveling device may be adjusted to maintain the proper clearance between the deck and the shell.

In the construction of floating decks the general practice is to make the diameter of the deck about two feet to 30 inches less than the diameter of the shell, so that there will be sufficient clearance between the two to prevent binding or fouling even though the deck tilts or cants. As a result of having so large a clearance, a large quantity of oil evaporates from the area between the shell and the deck.

To reduce evaporation of the oil, I have developed a non-tilting deck which has but little clearance, consequently but little evaporation area which in turn limits the evaporation.

It is some times desirable, especially when high volatile oils or the like are being stored to cover the gap between the deck and the shell so as to prevent evaporation, smother any fire that might occur in the tank and to keep rain from getting into the stored liquid.

In Fig. 24, I have illustrated a shield for covering the clearance gap between the deck and shell which is composed of a plurality of overlapping parts 61 which are secured to a wooden strip 60 around the inner periphery of the rim 5. Each part 61 of the shield has a curved portion 62 which is secured to the nailing strip 60 in any suitable manner such as screws 63 extending through the center of the curved portion. The opposite edge of each part 61 of the shield is flanged as at 64 to form a heel portion 65 which is adapted to bear against the inner surface of the shell. By providing a comparatively large opening in the portion 62 through which the screws 63 extend, the shield is made flexible and the portion 65 of each part thereof is held against the shell by the force of gravity.

Certain other types of shields such as the fastening of rubber belting (not shown) to the nailing strip and allowing the other end to lie against the shell for closing the clearance gap can be substituted without departing from my invention.

In constructing a tank embodying my leveling device, I prefer to place the guides on the shell at such an angle that a one-foot change in the elevation of the deck will rotate the deck one foot, that is, the guides should be at an angle of approximately 45 degrees on the side of the shell. However, in some cases, it may be desired to have the guides extending at other angles.

While I have described a storage tank embodying my invention and modifications of certain features thereof, it is to be understood that other changes, additions and omissions may be made therein without departing from the spirit of my invention or the scope of the appended claims.

What I claim as new and desire to secure by Letters Patent is:

1. A storage tank comprising a shell, a plurality of guides disposed on the inner wall thereof, a floating deck in said shell, and means on the periphery of said deck adapted to cooperate with said guides for leveling said deck, said guides being helically disposed on said shell so that rotation will be imparted to said deck on each change of elevation.

2. A storage tank comprising a shell, a plurality of spaced helical guides disposed on the inner wall of said shell and a floating deck in said shell having a plurality of mating grooves spaced around the periphery thereof adapted to register with the guides on said shell for maintaining the deck in level position in said shell.

3. A storage tank comprising a shell having a plurality of spaced guides disposed on the inner wall thereof, said guides extending helically from the top to the bottom of said shell and a floating deck for said shell having means registering with said guides to maintain said deck in level position, the guides being helically arranged so that a rotating motion is imparted to said deck with changes of elevation in said shell.

4. A storage tank comprising a shell, a plurality of inwardly extending projections on the inner wall of said shell forming guides thereon, a floating deck having recesses in the periphery thereof and means disposed in said recesses cooperating with said guides for leveling said deck.

5. A storage tank comprising a shell, a plurality of inwardly extending projections forming guides on the inner wall of said shell, a roof adapted to float in said shell having recesses in the periphery thereof and means disposed in said recesses for cooperating with said guides for leveling said deck, the guides on said shell and the recesses in said deck extending helically from the top to the bottom of said shell and deck respectively so that rotation is imparted to said deck for each change of elevation of the deck in said shell.

6. A storage tank having a cylindrical shell provided with a plurality of inwardly disposed projections forming guides extending helically from the top to the bottom of said shell on the inner surface thereof and a floating roof having means adapted to cooperate with said guides to prevent tilting of said roof.

7. A storage tank comprising a cylindrical shell having guides disposed on the inner surface of said shell and arranged to slope from the top to the bottom thereof, a floating roof for said shell having recesses therein adapted to register with and receive said guides, means in said recesses for engaging said guides, and means removably secured to the periphery of the roof for reducing the clearance between said roof and said shell.

8. The combination in a storage tank of a shell having guides on the inner surfaces extending from top to bottom thereof, a roof adapted to float within said shell and having recesses adapted to receive said guides and means adapted to cooperate with said guides for preventing said roof from tilting in said shell.

9. The combination in a storage tank of a shell having a plurality of spaced guides extending helically from top to bottom thereof, a roof forming a water cover adapted to float within said shell and having recesses adapted to receive said guides and rollers mounted on said roof adapted to cooperate with said guides for leveling said roof in said tank.

10. The combination in a storage tank of a shell having a plurality of spaced guides extending helically from top to bottom thereof, a roof adapted to float within said shell, uprights mounted on said roof adjacent to said guides and non-friction means carried on said uprights adapted to engage the guides for preventing said roof from tilting in said shell.

11. The combination in a storage tank of a shell having a plurality of spaced guides in the form of a helix on the inner surfaces thereof, a roof adapted to float within said shell, recesses in the periphery of said roof adapted to receive said guide for rotating said roof when the elevation in said shell is changed and antifriction means carried in said recesses adapted to engage said guides for preventing the roof from tilting in said shell.

12. The combination in a storage tank of a shell having a plurality of spaced guides in the form of a helix on the inner surfaces thereof, a water top adapted to float within said shell, means on the periphery of said top arranged to cooperate with said guides for leveling the top in said shell, and means secured to said top for reducing the clearance between the shell and the top.

13. The combination in a storage tank of a shell having a plurality of spaced guides in the form of a helix on the inner surfaces thereof, a water top adapted to float within said shell, means on the periphery of said water top adapted to register with said guides for imparting rotational movement thereto when the elevation of the liquid in said shell is changed, uprights mounted on said water top, and antifriction means pivoted on said uprights adapted to engage said guides for preventing the top from tilting in said shell.

14. The combination in a storage tank of a shell having a plurality of spaced guides in the form of a helix on the inner surfaces thereof, a roof adapted to float within said shell, recesses in the periphery of said roof adapted to receive said guides for rotating said roof when the elevation of said roof is changed, uprights mounted on said roof above said recess having rollers pivotally carried thereon adapted to engage said guides for leveling the roof in said shell and means for permitting vertical movement of said rollers.

15. The combination in a storage tank of a shell having a plurality of spaced guides in the form of a helix on the inner surface thereof, a water top adapted to float within said shell having, recesses in the periphery thereof arranged to receive said guides for rotating said top on changes in elevation, means in said recesses adapted to engage said guides for preventing the top from tilting in said shell, said means being adjustable so that the proper clearance between the guides and the recesses can be maintained, and fills removably secured to the periphery of said top for reducing the clearance between the top and the shell.

16. In a storage tank, the combination of a shell and a floating roof therefor, said shell having guide rails spaced on the inner surface and extending helically from the top to the bottom thereof, said roof having recesses therein adapted to receive said guides and adjustable means adapted to cooperate with said guides for preventing said roof from tilting.

17. The combination in a storage tank of a shell, a deck adapted to float within said shell, means on said shell for rotating said deck on changes of elevation and means on said deck adapted to cooperate with said first mentioned means for leveling the deck within said shell.

18. A storage tank comprising a cylindrical shell having a plurality of helically arranged guides forming grooves on the inner surface thereof, a floating roof for said tank, and members on the periphery of said roof adapted to be received in said grooves for leveling said roof.

19. A storage tank comprising a cylindrical shell having a plurality of helically arranged inwardly extending projections on the inner surface thereof forming helical grooves therebetween, and a floating roof for said tank having non-friction members on the periphery thereof adapted to be received in said grooves for preventing the roof from tilting in said tank.

20. A storage tank comprising a cylindrical shell having a plurality of projections on the inner surface thereof arranged in the form of a helix and forming grooves therebetween, a floating roof for said tank having inclined recesses in the periphery of said roof for receiving the projections on said shell, and a plurality of roller members disposed in each of said recesses and adapted to be received in said grooves for maintaining the roof level within the shell.

21. The combination in a storage tank of a shell having a plurality of helical guides on the inner surface thereof, a floating deck spaced in said shell and having recesses adapted to receive said guides, means cooperating with said guides for leveling said roof in said shell, and means for covering the space between said deck and said shell.

22. The combination in a storage tank of a shell having a plurality of helical guides on the inner surface thereof, a floating deck spaced in said shell and having recesses adapted to receive said guides, means cooperating with said guides for leveling said roof in said shell, and means for covering the space between said deck and said shell, said means including a plurality of overlapping shields having a curved portion secured to the periphery of said deck and a flanged portion adapted to bear against said shell, said curved portion being secured to said deck in such a way that the flanged portion is held against said shell by gravity.

23. The combination in a storage tank, of a shell having a plurality of helically arranged guides on the inner surface thereof, a floating deck within said shell, means on the periphery of the deck for cooperating with said guides for preventing titling of the deck and removable fills on the periphery of said deck for reducing the clearance between the deck and the shell.

24. The combination with a storage tank, of a shell, a water top adapted to float within said shell, and screw acting levelling means between said shell and water top to make the top non-tiltable.

25. The combination with a liquid storage tank, of a cylindrical shell, a series of guides on the inner surface of said shell, a water top adapted to float on the liquid in said shell, and mating devices on the periphery of the top cooperating with said guides to eliminate tilting of said top.

26. The combination with a liquid storage tank, of a cylindrical shell, a series of helically extending members on the inner surface of the shell, a deck adapted to float on the liquid in said shell, a series of helically extending members on the periphery of said deck, coacting with the members on said shell for holding the deck level therein, and means for reducing the clearance between the shell and the deck.

27. A liquid storage tank comprising a shell, a deck adapted to float on the liquid in said shell, a series of members arranged on the inner surface of the shell at an angle to the vertical axis thereof, a series of members arranged on the periphery of said deck at an angle corresponding to the angle of the members on said shell for cooperating therewith and levelling said deck in said shell.

28. A liquid storage tank comprising a shell, a deck adapted to float on the liquid in said shell, a series of members arranged on the inner surface of the shell at an angle to the vertical axis thereof, a series of members arranged on the periphery of said deck at an angle corresponding to the angle of the members on said shell for cooperating therewith and levelling said deck in said shell, and means removably secured to the periphery of the deck for reducing the clearance between the shell and the deck.

29. The combination with a liquid storage tank, of a cylindrical shell, a water top adapted to float on the liquid in said shell, and means on the inner surface of said shell cooperating with the periphery of said water top for rotating it as the liquid in said tank rises and falls and for holding said top level within the shell to prevent tilting thereof.

In testimony whereof, I have hereunto subscribed my name this 10th day of September, 1930.

HUBERT P. SMITH.